United States Patent [19]

Kleine et al.

[11] 4,184,543

[45] Jan. 22, 1980

[54] HEAT EXCHANGER EXHIBITING IMPROVED MECHANICAL AND THERMAL STABILITY

[75] Inventors: Charles A. Kleine, Florissant, Mo.; Verne L. Middleton, East Alton, Ill.

[73] Assignee: Olin Corporation, New Haven, Conn.

[21] Appl. No.: 932,974

[22] Filed: Aug. 11, 1978

Related U.S. Application Data

[63] Continuation of Ser. No. 703,054, Jul. 6, 1976, abandoned, which is a continuation-in-part of Ser. No. 573,953, May 2, 1975.

[51] Int. Cl.² ............................................. F28F 3/14
[52] U.S. Cl. ..................................... 165/170; 126/444
[58] Field of Search .................. 62/523, 525; 126/271; 165/170; 237/1 A; 29/157.3 D, 157.3 V; 113/118 D, 118 V

[56] References Cited

U.S. PATENT DOCUMENTS

| | | | |
|---|---|---|---|
| 1,779,911 | 10/1930 | Litle, Jr. ............................ | 113/118 V |
| 3,114,202 | 12/1963 | Wenger ............................ | 29/157.3 V |
| 3,502,142 | 3/1970 | McGuffey ............................ | 165/170 |
| 3,757,856 | 9/1973 | Kun ............................ | 29/157.3 D |
| 3,822,742 | 7/1974 | Stowell ............................ | 165/170 |

FOREIGN PATENT DOCUMENTS

| | | | |
|---|---|---|---|
| 57827 | 2/1913 | Austria ............................ | 165/170 |
| 819022 | 10/1937 | France ............................ | 165/170 |
| 28273 | of 1911 | United Kingdom ............ | 126/271 |
| 424629 | 2/1935 | United Kingdom ............ | 165/170 |

*Primary Examiner*—Sheldon Richter
*Attorney, Agent, or Firm*—Victor A. DiPalma; Paul Weinstein

[57] ABSTRACT

A heat exchanger having a desired system of tubular passageways for a heat exchange medium defining opposed headers connected by connecting portions of said passageways extending therebetween, said passageways having entry and exit portions extending from said headers to provide ingress and egress openings for said heat exchange medium, wherein said tubular passageways comprise a plurality of island-like distentions connected by a plurality of tubular channels passing therebetween, said tubular channels positioned with their longitudinal axes at an angle to both the longitudinal and transverse dimensions of said panel, said distentions and tubular channels serving to enhance resistance to bending under mechanical stress and reduce the incidence of failure at fluid temperature near or at their freezing point.

7 Claims, 8 Drawing Figures

HEAT EXCHANGER EXHIBITING IMPROVED MECHANICAL AND THERMAL STABILITY

CROSS REFERENCE TO RELATED APPLICATION

The present application is a continuation of application Ser. No. 703,054, filed July 6, 1976, now abandoned, which application was a continuation-in-part of application Ser. No. 573,953, filed May 2, 1975.

BACKGROUND OF THE INVENTION

The present invention relates to metal panels having a system of internal tubular passageways disposed between spaced apart portions of the thickness of the panel. Said panels possess utility in heat exchange applications wherein a heat exchange medium is circulated through said passageways. A particular application of said panels resides in devices utilizing solar energy, and specifically, solar energy absorbing devices for elevating fluid temperature.

It is well known that the radiation of the sun can be collected as a source of energy for heating or cooling or for direct conversion to electricity. Heating and cooling depend upon collection of rays of solar energy in a fluid heating transfer system. The heated fluid is pumped or allowed to flow to a place of utilization for the thermal energy it has acquired.

In certain areas of the world, solar energy is the most abundant form of available energy if it could be harnessed economically. Even in more developed areas of the world, the economic harnessing of solar energy would provide an attractive alternative to the use of fossil fuels for energy generation.

One of the problems attending the development of an efficient system for the conversion of solar energy resides with the structure and design of the solar energy absorbing device, or solar collector. This solar collector generally comprises a rectangular plate-like structure possessing channels or passageways for the circulation of the energy absorbing fluid medium. Conventionally, these panels have comprised a pair of opposed expanded passageways, known as headers, which are placed at opposite ends of the panel, and are connected by a plurality of tubular passageways which are often in parallel relation with respect to each other. These passageways, as well as the headers themselves, have generally been disposed at right angles with respect to each other and in parallel relation with respect to the horizontal and vertical dimensions, respectively, of the panel.

The aforementioned configuration suffers from certain deficiencies in that the parallel relation in which the connecting portions are often placed appears to render the heat exchanger susceptible to bending or warpage under stress in the instance where the heat exchanger comprises a flat panel. This bending often occurs in both the longitudinal and transverse axes and can, in certain instances, result in blockage of one or more of the tubular passageways by a crimping effect occurring when the panel bends.

A further difficulty has been observed in the instance where heat exchangers of the type described above are employed in systems which undergo exposure to extreme temperature changes wherein the heat exchange fluid is exposed to temperatures which could cause freezing thereof. In this particular instance the units employing substantially parallel connecting portions were found to rupture during tests where fluid was placed therein and frozen, and then allowed to thaw. This type of testing is critical, as resistance to freeze-up is necessary in the event that a heat exchange system fails and fluid remains in the connecting portions.

SUMMARY OF THE INVENTION

In accordance with the present invention, a heat exchanger is provided which possesses significantly improved efficiency, and specific utility in solar energy applications.

The panel of the present invention comprises a system of tubular passageways for a heat exchange medium defining opposed headers connected by connecting portions of said passageways extending therebetween, said passageways having entry and exit portions extending from said headers to provide ingress and egress openings for said heat exchange medium, wherein said tubular passageways comprise a plurality of island-like distentions connected by a plurality of tubular channels passing therebetween, said tubular channels positioned with their longitudinal axes at an angle to both the longitudinal and transverse dimensions of said panel, said distentions and tubular channels enhance resistance to bending under mechanical stress and reduce the incidence of failure at fluid temperature near or at their freezing point.

In the preferred embodiment, the panel of the present invention comprises a system of internal tubular passageways for a heat exchange medium, said passageways disposed between spaced apart portions of the thickness of the panel to define opposed headers connected by connecting portions of said passageways extending therebetween. The passageways are provided with entry and exit portions extending from the headers to opposed edges of the panel in order to provide ingress and egress openings for the heat exchange medium. The tubular passageways of the present invention including both comprise a plurality of island-like distentions preferably possessing substantially circular perimeters, which are connected by a plurality of preferably non-linearly directed tubular channels passing therebetween. The tubular channels are generally positioned with their longitudinal axes at an angle to both the longitudinal and transverse dimensions of the panel.

The panels of the present invention may possess a wide variation in configuration. Thus for example, the distentions may be displaced in random orientation, or may be placed in a regular, symmetrical relation to each other. The tubular channels may be placed at various angles with respect to the longitudinal and transverse dimensions of the panel, and may vary in number and size. Also, the headers may define an angle of at least 91°, and generally from 92° to 100° with respect to the direction of flow of said heat exchange medium as determined with respect to a longitudinal edge of said panel.

The panels of the present invention exhibit improved mechanical strength and, particularly, resistance to panel bending and warpage by the use of the angled tubular channels. Further, the provision of the island-like distentions enables the panel to withstand the increased pressures attending the passage of the heat exchange liquid through a freezing cycle without rupture or warpage.

As indicated above, the preferred embodiment of the present invention utilizes a metal panel having a system of internal fluid passageways, conventionally painted black, as will be described in more detail hereinbelow. The concepts of the present invention may, however, also be advantageously utilized in heat exchangers generally, such as, for example, using extrusions. Since the concepts of the present invention are particularly advantageous in metal panels having a system of internal fluid passageways, the present invention will be specifically described hereinbelow utilizing this type of system.

Accordingly, it is a principal object of the present invention to provide a metal panel for use in heat exchange applications which facilitates the efficient transfer of heat energy over a wide range of temperatures.

It is a further object of the present invention to provide a metal panel as aforesaid which possesses improved mechanical strength and resistance to warpage.

It is yet a further object of the present invention to provide a metal panel as aforesaid which is designed to resist warpage and rupture resulting from exposure to extreme temperatures.

It is a still further object of the present invention to provide a metal panel as aforesaid which is particularly suited for use in a solar energy collector system.

Further objects and advantages will become apparent to those skilled in the art as a detailed description proceeds with reference to the following drawings.

DETAILED DESCRIPTION

In accordance with the present invention, the foregoing objects and advantages are readily attained.

The panels of the present invention exhibit a unique mechanical strengthening feature in the provision of a system of tubular passageways comprising a plurality of spaced apart island-like distentions connected by a plurality of substantially non-linear, tubular channels, wherein said tubular channels are positioned with their longitudinal axes at an angle to both the longitudinal and transverse dimensions of the panels. This arrangement provides increased mechanical strength and resistance to bending and warping under stress. Further, the distentions provide a similar resistance to warpage and rupture resulting from the operation of the panel at a temperature level within which the heat exchange fluid is likely to freeze.

Figure 1:
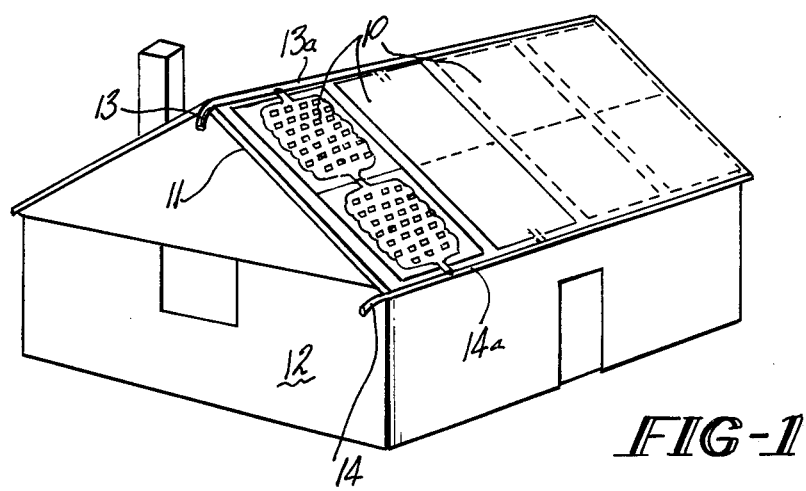
FIG. 1 is a diagram showing schematically the manner in which the panels of the present invention can be embodied.

The panels of the present invention are preferably utilized in a solar heating system as shown in FIG. 1 wherein a plurality of panels of the present invention 10 are mounted on roof 11 of building 12 with conduits 13 and 14 connected in any convenient fashion to the equipment in the building, with the connections not shown. Thus, for example, cold water may go into conduit 13 from the building 12 by means of a conventional pump or the like. The water flows along common manifold 13a and is distributed into panels 10. The water flows through panels 10, is heated by means of solar energy, is collected in common manifold 14a and flows into conduit 14. The heated water is then stored or utilized in a heat exchange system inside the building in a known manner. Naturally, if desired, the water flow may be reversed with the cold water entering via conduit 14 and collected via conduit 13. Alternatively, the solar heating unit of the present invention may be used or placed in any suitable environment, such as on the ground with suitable fasteners to prevent displacement by wind or gravity. The solar heating unit of the present invention may be used for residential heating purposes, such as in providing hot water in a residential environment. For example, three panels of the present invention having dimensions of 8 feet×4 feet would efficiently supply an average household of four with hot water for home use. Alternatively, the solar panels of the present invention may be conveniently used for heating water for swimming pools or for preheating water for domestic gas or oil fired domestic hot water heaters. The fluid is preferably retained in a closed system with the water in the system heated in the solar unit and delivered into an insulated cistern or container so that the heated fluid may be stored up during sunshine for use on cool cloudy days or at night when the heating of the fluid in the panel will not be of sufficient degree to provide the desired heat at the point of use.

A thermostat not shown is desirably installed at the top of the solar heater and this thermostat may be set to turn on a circulating pump whenever the temperature reaches a predetermined reading. The pump will then pump the water through the system as generally outlined above.

Figure 2:
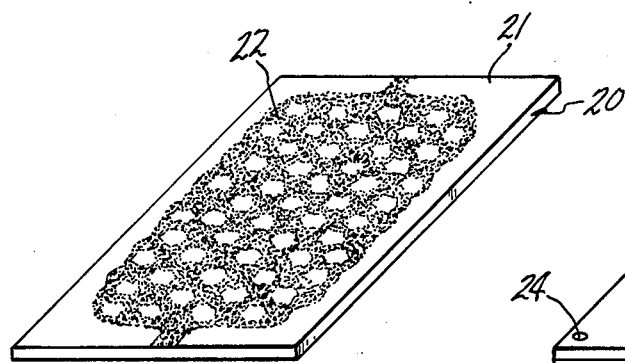
FIG. 2 is a perspective view of a sheet of metal having a pattern of weld-inhibiting material applied to a surface thereof.
Figure 3:
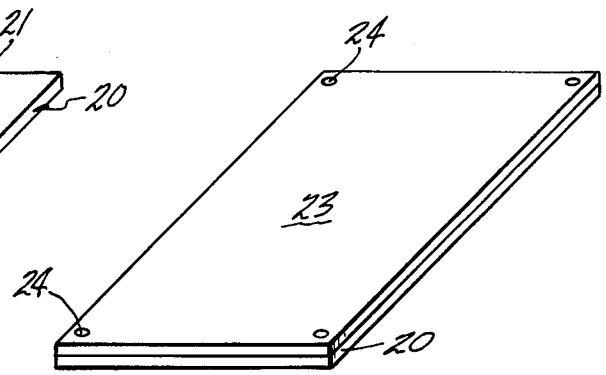
FIG. 3 is a perspective view of a composite metal blank wherein a second sheet of metal is superimposed on the sheet of metal shown in FIG. 2 with the pattern of weld-inhibiting material sandwiched therebetween.
Figure 4:
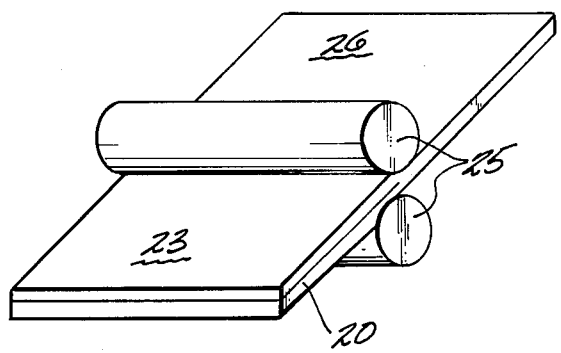
FIG. 4 is a schematic perspective view showing the sheets of FIG. 3 being welded together while passing through a pair of mill rolls.

As indicated above, the present invention contemplates a particularly preferred panel design for optimum efficiency in a solar heating system as described above. The metal panel or plate of the present invention is desirably fabricated by the ROLL-BOND ® process as shown in U.S. Pat. No. 2,609,002. FIG. 2 illustrates a single sheet of metal 20 as aluminum or copper or alloys thereof, having applied to a clean surface 21 thereof a pattern of weld-inhibiting material 22 corresponding to the ultimate desired passageway system. FIG. 3 shows the sheet 20 having superimposed thereon a second sheet 23 with a pattern of weld-inhibiting material 22 sandwiched between the units. The units 20 and 23 are tacked together as by support welds 24 prevent relative movement between the sheets as they are subsequently welded together as shown in FIG. 4 by passing through a pair of mill rolls 25 to form welded blank 26. It is normally necessary that the sheets 20 and 23 be heated prior to passing through the mill rolls to assure that they weld to each other in keeping with techniques well-known in the rolling art.

Figure 5:
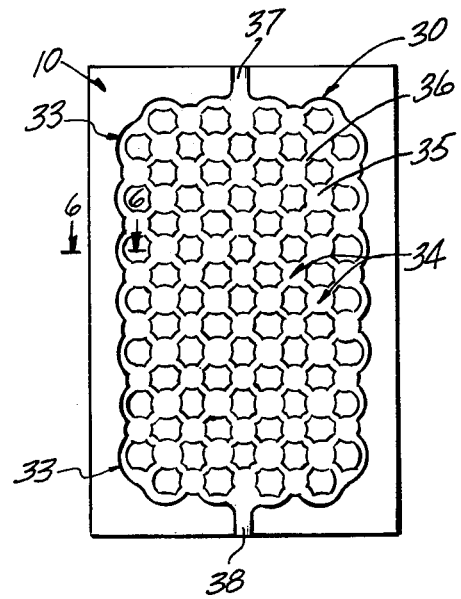
FIG. 5 is a top view showing the panel of the present invention having internal tubular passageways disposed between spaced apart portions of the thickness of the panel in the areas of the weld-inhibiting material.
Figure 6:
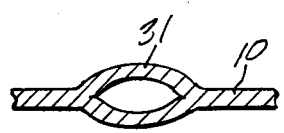
FIG. 6 is a sectional view taken along lines 6—6 of FIG. 5.

The resultant blank 26 is characterized by the sheets 20 and 23 being welded together except at the area of the weld-inhibiting material 22. The blank 26 with the unjoined inner portion corresponding to the pattern of weld-inhibiting material 22 may then be softened in any appropriate manner as by annealing, and thereafter the blank may be cold rolled to provide a more even thickness and again annealed. The portions of the panel adjacent the weld-inhibiting material 22 are then inflated by the introduction of fluid distending pressure, such as with air or water, in a manner known in the art to form a system of internal tubular passageways 30 corresponding to the pattern of weld-inhibiting material, as shown in FIG. 5. The passageways 30 extend internally within panel 10 and are disposed between spaced apart portions of the thickness of said panel. Thus, panel 10 comprises a hollow sheet metal panel or plate having a system of fluid passageways 30 for a heat exchange medium extending internally therein. In accordance with the present invention, passageways 30 are formed without the presence of superimposed platens, and the resultant passageway configuration has a semicircular shape 31 as shown in FIG. 6.

As shown in FIG. 5, the passageways 30 include opposed headers 33 connected by connecting portions 34 of said passageways extending substantially longitudinally in panel 10 between headers 33 and interconnecting same. Opposed headers 33 and connecting portions 34 comprise a network of distentions 35, preferably spaced apart from each other, connected by essentially non-linearly directed tubular channels 36 extending therebetween. Also, passageways 30 include entry and exit portions 37 and 38, respectively, which extend from headers 33 to provide ingress and egress openings for the heat exchange medium.

As noted earlier, the provision of the connecting portions of the present invention contributes to improved mechanical strength evidenced in resistance to bending and warpage of the panel during normal use. Also, the provision of the island-like distentions in the manner disclosed herein provides the panel with stability and resistance to damage occasioned by the freezing of heat exchange fluid in contact with correspondingly depressed temperature ranges.

The foregoing characteristics may be developed, particularly in panels prepared by the ROLL-BOND® process, with the observance of certain design guidelines. Thus, the tubular channels must be provided with their centerlines lying at an angle to both the longitudinal and the transverse dimensions of the panel. Further, the tubular channels should be of a continually curving nature, and should possess substantially non-linearly directed, longitudinal axes, whether lying in either the longitudinal or transverse directions. Both of these characteristics ensure that rotational stresses built up during panel operation will not be relieved through the tubular channels to promote warpage of the panel.

A corollary to the above comprises the requirement that the tubular channels be prepared with a cross-sectional shape which is either round or oval, as channels possessing either shape are not as susceptible to longitudinal bending moments along their own axes. Thus, though the preparation of panels by the ROLL-BOND® process alternatively provides the preparation of passageways possessing flattened configurations by inflation between preset platens, the passageways comprising the tubular channels of the present invention must be inflated without restriction, as noted above, to achieve either the round or the oval shape and the strength resulting therefrom.

Referring further to FIG. 5, island-like distentions 35 are seen to possess a substantially circular perimeter. Further, distentions 35 are generally provided as illustrated in spaced apart relation to each other and are connected by channels 36. Distentions 35 provide an area for passageway expansion under pressure to take place wherein an increment of such expansion can be tolerated without passageway warpage and rupture. Specifically, testing of the panels of the present invention was successfully conducted at an arbitrary minimum warp pressure of 100 psi, and panels exposed to freeze-thaw cycles ranging in temperature from $-3°$ F. to $+70°$ F. showed no damage after completion of up to 14 such freeze-thaw cycles. Thus, the provision of distentions 35, preferably in the shape of substantially circular pads, is seen to provide a marked resistance to rupture resulting from exposure to extreme temperature ranges during operation which renders the panels of the present invention particularly useful in a wide variety of applications.

As can be seen in FIG. 5, passageways 30 comprise a plurality of distentions 35 linked by channels 36. As illustrated, distentions 35 may preferably be displaced in a regularly spaced apart relation to each other which may assume a symmetrical pattern, though it is to be understood that the invention is not limited thereby as random orientation of distentions and channels may be employed. The size and number of distentions and channels employed in the panels of the present invention may likewise vary to suit the particular flow requirements of the application for which the panel is manufactured. In the instance where the panel is to serve as a solar collector, optimum usage of the concepts of the present invention would suggest that a pattern of the type illustrated in FIG. 5 may be employed wherein a large number of distentions and channels are employed in regular symmetrical relationship with respect to each other to allow a maximum fluid flow to take place through the panel.

As noted above, the panels of the present invention may assume a wide variety of configurations which embody the feature of improved passageways disclosed herein. Specifically, referring to FIG. 7, panel 40 is depicted which generally resembles panel 10 in its gross configuration. Panel 40 is modified by the provision of headers 41 which are inclined with respect to the direction of fluid flow, corresponding in this instance, to the longitudinal dimension of the panel. Specifically, headers 41 are inclined at an angle of at least 91°, and preferably 92° to 100° with respect to longitudinal edge 42 of panel 40. The aforementioned angle, labeled α, is actually measured in relation to a central axis 42′, shown in phantom, running through entry portion 43 and exit portion 44, respectively, which is parallel to edge 42. This configuration has been found to enhance fluid flow and exit drainage through the passageways of the panel, thereby preventing air locks and sediment collection due to fluid stagnation.

Figures 7, 8:
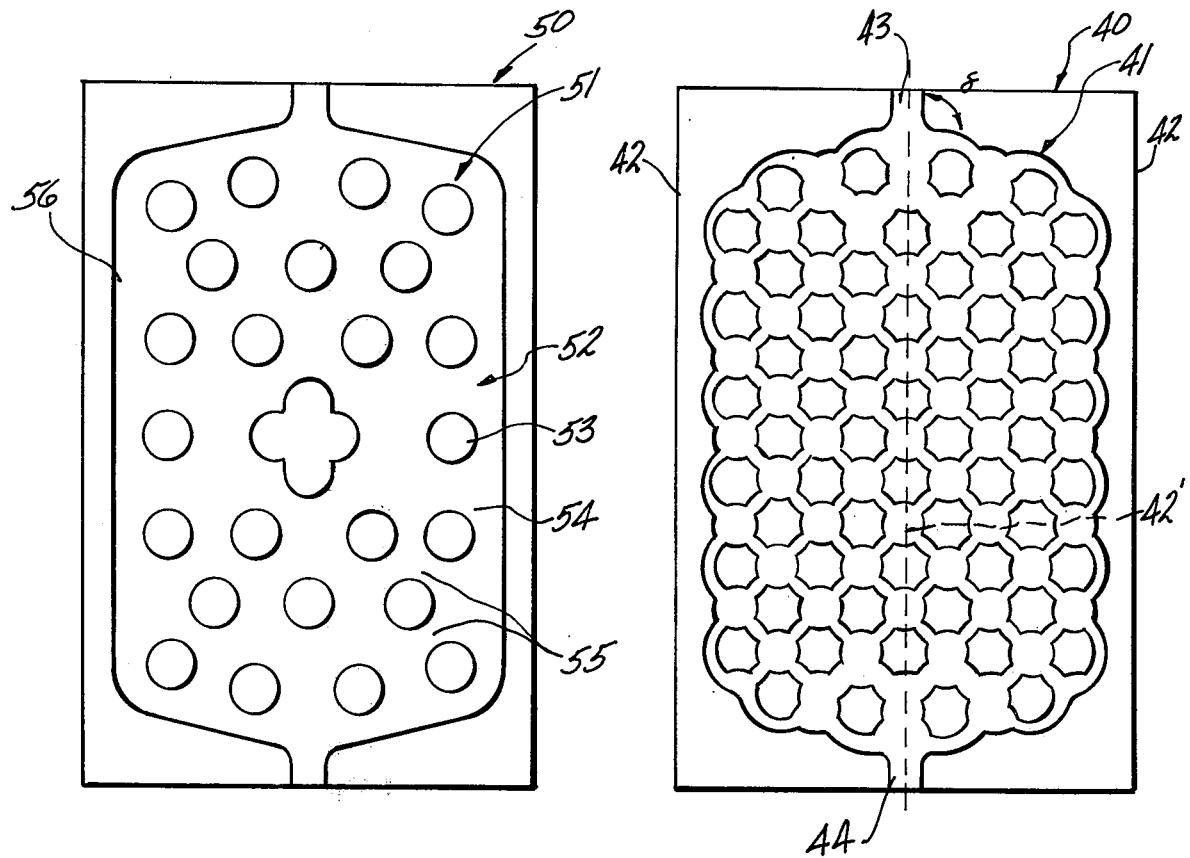
FIGS. 7 and 8 are top views showing alternate embodiments of the present invention.

Referring now to FIG. 8, panel 50 is depicted which comprises a variant of the panel shown in FIG. 7. Thus, panel 50 comprises a waffle-type pattern resembling the gross configuration of panel 40, in that headers 51 are disposed at an angle similar to that depicted with respect to panel 40. In this design, the use of circular bonded portions 53 throughout headers 51 and connecting portions 52 results in a more loosely defined pattern of distentions and channels. Thus, distentions 54 are defined by their surrounding bonded portions 53, and tend to resemble unbonded expanses. Likewise, channels 55 are loosely defined by the presence of adjacent bonded portions 53. Unlike the panel of FIG. 7, panel 50 defines a fairly straight-line perimeter 56 which follows the length and breadth of the passageway pattern. This straight-line perimeter, however, does not impair the bending or warpage resistance of the panel.

Naturally, further alternative designs may be envisioned by one skilled in the art in accordance with the concepts described above.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An integral metal panel for use in a solar energy collector system, said panel being formed of at least two sheets of metal, said panel having a generally rectangular shape comprising first and second opposing short edges and third and fourth opposing long edges, said sheets being partially spaced apart to define a spaced apart portion and opposing headers adjacent said first and second edges respectively of said panel connected by a plurality of tubular passageways extending between said headers and entry and exit passageways extending generally centrally between said third and fourth edges of said panel from said headers to said first and second edges respectively of said panel, said tubular passageways being defined by a plurality of individual bonded portions arranged in said spaced apart portion of said panel intermediate said headers, said individual bonded portions having a circular shape and being arranged in rows transversely to said third and fourth edges of said panel, with the individual circular bonded portions in one row being staggered and of a size just sufficient to be barely overlapped with respect to the individual bonded portions in a next adjacent row so that there is no linear path extending from said entry to said exit passageways which can be followed by a heat exchange medium flowing through said panel and so that said heat exchange medium follows a plurality of divided and subdivided random flow paths.

2. A plurality of panels according to claim 1 including a common distribution manifold connected to each of said entry passageways for distribution of said heat exchange medium into said panels and a common collection manifold connected to each of said exit portions for collection of said heat exchange medium from said panels.

3. The panel of claim 1 wherein said passageways all possess a substantially rounded cross-sectional configuration.

4. The panel of claim 1 wherein said headers define an angle of at least 91° with respect to the axes of said entry and exit passageways.

5. The panel of claim 4 wherein said headers include a plurality of bonded portions arranged in a non-linear row generally transverse to said third and fourth edges of said panel.

6. The panel of claim 4 wherein said headers define an angle of from 92° to 100° with respect to said axes.

7. The panel of claim 6 wherein said headers include a plurality of bonded portions arranged in a non-linear row generally transverse to said third and fourth edges of said panel.

* * * * *